United States Patent [19]

Moller et al.

[11] Patent Number: 5,491,445
[45] Date of Patent: Feb. 13, 1996

[54] BOOSTER POWER CONVERTER HAVING ACCELERATED TRANSIENT BOOST RESPONSE

[75] Inventors: David D. Moller, Kokomo, Ind.; James B. Archibald, Reading, Pa.

[73] Assignee: Delco Electronics Corporation, Kokomo, Ind.

[21] Appl. No.: 270,539

[22] Filed: Jul. 5, 1994

[51] Int. Cl.⁶ .................. G05F 1/40; G05F 1/10
[52] U.S. Cl. .......... 327/540; 327/306; 323/282; 323/222
[58] Field of Search .................. 327/54, 56, 57, 327/74, 87, 175, 177, 323, 332, 536, 538, 306, 333, 323, 331, 332; 323/222, 282, 283

[56] References Cited

U.S. PATENT DOCUMENTS

| | | | |
|---|---|---|---|
| 4,975,820 | 12/1990 | Szepesi | 323/282 |
| 4,980,576 | 12/1990 | Rossi et al. | 327/306 |
| 5,003,454 | 3/1991 | Bruning | 323/222 |
| 5,028,861 | 7/1991 | Pace et al. | 323/222 |
| 5,170,333 | 12/1992 | Niwayama | 323/222 |
| 5,193,211 | 3/1993 | Nobusawa | 323/222 |
| 5,337,284 | 8/1994 | Cordoba et al. | 327/540 |
| 5,343,084 | 8/1994 | Gens | 327/306 |

*Primary Examiner*—Timothy P. Callahan
*Assistant Examiner*—Jung Ho Kim
*Attorney, Agent, or Firm*—Mark A. Navarre

[57] ABSTRACT

A booster power converter particularly suited for an automobile and having a compensation network that responds to a sudden negative input voltage excursion. The booster power converter responds to the negative input excursion by preventing its boosted output from falling below a predetermined voltage level so that voltage regulators, normally connected to the output stage of the booster power converter, are not disrupted in performing their desired regulation. The compensation network, upon sensing a decrease of the booster voltage below a predetermined lower limit, generates a control signal which causes the booster power converter to seek and obtain a maximum duty cycle operation. Upon sensing an increase of the booster voltage above a predetermined upper limit, the compensation network removes the control signal causing the booster power converter to cease operation at its maximum duty cycle, and return to its normal duty cycle of operation.

3 Claims, 5 Drawing Sheets

5,491,445

1

BOOSTER POWER CONVERTER HAVING ACCELERATED TRANSIENT BOOST RESPONSE

TECHNICAL FIELD

The present invention relates to booster power converters that are particularly suited for automotive applications. More particularly, the present invention relates to circuitry for increasing the speed of response of the booster power converter to compensate for any rapid decreases in its input voltage so as to maintain its output voltage at a sufficient level to prevent voltage regulators connected at its output stage from going out of regulation. Specifically, the present invention provides circuitry that monitors the output boosted voltage and generates a control signal when the booster voltage falls below a predetermined value so that the booster power converter seeks and obtains its maximum duty cycle causing the output boosted voltage to be rapidly increased before the voltage regulators go out of regulation.

BACKGROUND OF THE INVENTION

Booster power converters have a duty cycle in which short intervals of charges are supplied so that a received input voltage is boosted up to an output voltage which is higher than the input voltage. Booster power converters use an inductive-capacitive arrangement, having a time constant, to develop the short intervals of charges. The booster power converters are particularly suited for use in vehicles wherein the input voltage is supplied from a battery and the boosted output voltage is delivered to voltage regulators. Under steady state conditions, the boosted voltage rises and falls about a limit which is preselected so that the voltage regulators perform correctly. The booster power converters, primarily because of their relatively large time constant determined by the inductive-capacitive arrangement, have a relatively slow response and are sometimes incapable of responding to negative input voltage excursions so that the boosted output voltage falls below a desired value, thereby, causing the voltage regulators to be unable to perform proper regulation.

SUMMARY OF THE INVENTION

It is, therefore, a primary object of the present invention to provide a booster power converter that uses an inductor-capacitor arrangement to supply short interval of charges, but has a response time which is sufficient fast to respond to the input voltage excursions while still maintaining its boosted output at a predetermined level so that voltage regulators may properly perform.

Another object of the present invention is to provide a booster power converter than maintains its boosted output voltage within a predetermined range even in spite of variations in the applied input voltages.

It is another object of the present invention to provide a booster power converter wherein its duty cycle is adapted to compensate for the input voltage excursions so that the boosted output voltage does not fall below a predetermined limit.

It is another object of the present invention to provide a booster power converter having circuit means which safeguards against overcurrent conditions so as to prevent any damage to the converter or to voltage regulators normally connected to its output stage.

2

Other objects of the present invention, as well as advantages thereof over existing prior art forms, which will be apparent in view of the following description are accomplished by means hereinafter described and claimed.

In general, the booster power converter embodying the concepts of the present invention utilizes an arrangement of a comparator and a transistor switch which cause associated circuitry of the booster power converter to seek and obtain its maximum duty cycle so that the output voltage of the converter is rapidly increased to offset for negative excursions of the input voltage applied to the converter.

To appreciate the invention in its operative environment, the booster power converter is selected so that the comparator and transistor switch arrangement establishes an operating range in which the duty cycle and booster output voltage of the converter are rapidly increased to compensate for negative voltage excursions of the input voltage and, then, the duty cycle is allowed to return to its normal or steady state condition.

In one embodiment, the booster power converter develops a boosted voltage $V_{boost}$ and comprises an arrangement of an inductor, a diode, a storage capacitor, a voltage divider, an error amplifier, an arrangement of a first comparator and a first transistor switch, a second comparator, and an arrangement of a flip-flop and a second transistor switch. The inductor has a first end connected to the input voltage supplied to the booster power converter and a second end connected to the anode of the diode and forming a first node therebetween. The cathode of the diode is connected to a first end of the storage capacitor which has a second end connected to a circuit common. The first end of the storage capacitor is connected to an input terminal of the voltage divider forming a second node therebetween and on which the booster voltage $V_{boost}$ is present. The voltage divider has an output terminal connected to the circuit common. The error amplifier has a first input connected to an intermediate terminal of the voltage divider and on which is present an input signal $V_{comp-1}$. The error amplifier has a second input connected to a first reference voltage. The error amplifier develops an output voltage $V_{comp-2}$ proportional to the difference between its first and second inputs. The first comparator has a first input connected to the second node and on which the booster voltage $V_{boost}$ is present. The first comparator has an internal reference that establishes a threshold band having lower and upper predetermined limits and against which the booster voltage $V_{boost}$ is compared. The first comparator respectively generates and terminates a control signal CS when the booster voltage $V_{boost}$ is less than and more than the respective predetermined lower and upper limits. The control signal CS is connected to a gate terminal of the first transistor switch and renders the first transistor switch conductive. The second comparator has a first input receiving the output voltage $V_{comp-2}$ and a second input receiving a linearly rising and falling sawtooth wave signal OS having a predetermined duration and with predetermined high and low values. The second comparator develops a pulse signal PS when the amplitude of the OS signal exceeds that of the $V_{comp-2}$ signal. The second transistor switch has input, gate and output electrodes and is arranged to have its input electrode connected to the first node, its gate electrode responsive to the flip-flop, and its output electrode connected to the circuit common. The flip-flop has set and reset inputs. The reset input receives the pulse signal PS and the second input receives a timing signal MD which is representative of the predetermined maximum duty cycle of the booster power converter. The flip-flop generates an output drive signal DRV indicative of the presence of the pulse signal PS. The drive signal DRV is connected to the gate electrode of the second transistor switch and renders the second transistor switch conductive. In one embodiment, the booster power converter further comprises an OR circuit, a sensing resistor, and a third comparator. The OR circuit is interposed between the second comparator and the reset input of the flip-flop and has first and second inputs with the first input receiving the pulse signal PS. The sensing resistor is interposed between the output electrode of the second transistor switch and the circuit common and has a first end. The third comparator has its first input connected to the first end of the sensing resistor and a second end connected to a predetermined voltage corresponding to a predetermined maximum operating current for the booster power converter. The third comparator develops an output voltage SC, indicative of an overcurrent condition, when the voltage present on its first input exceeds the predetermined reference voltage. The output voltage SC is connected to the second input of the OR circuit.

DESCRIPTION OF EXEMPLARY EMBODIMENTS

Figure 1:
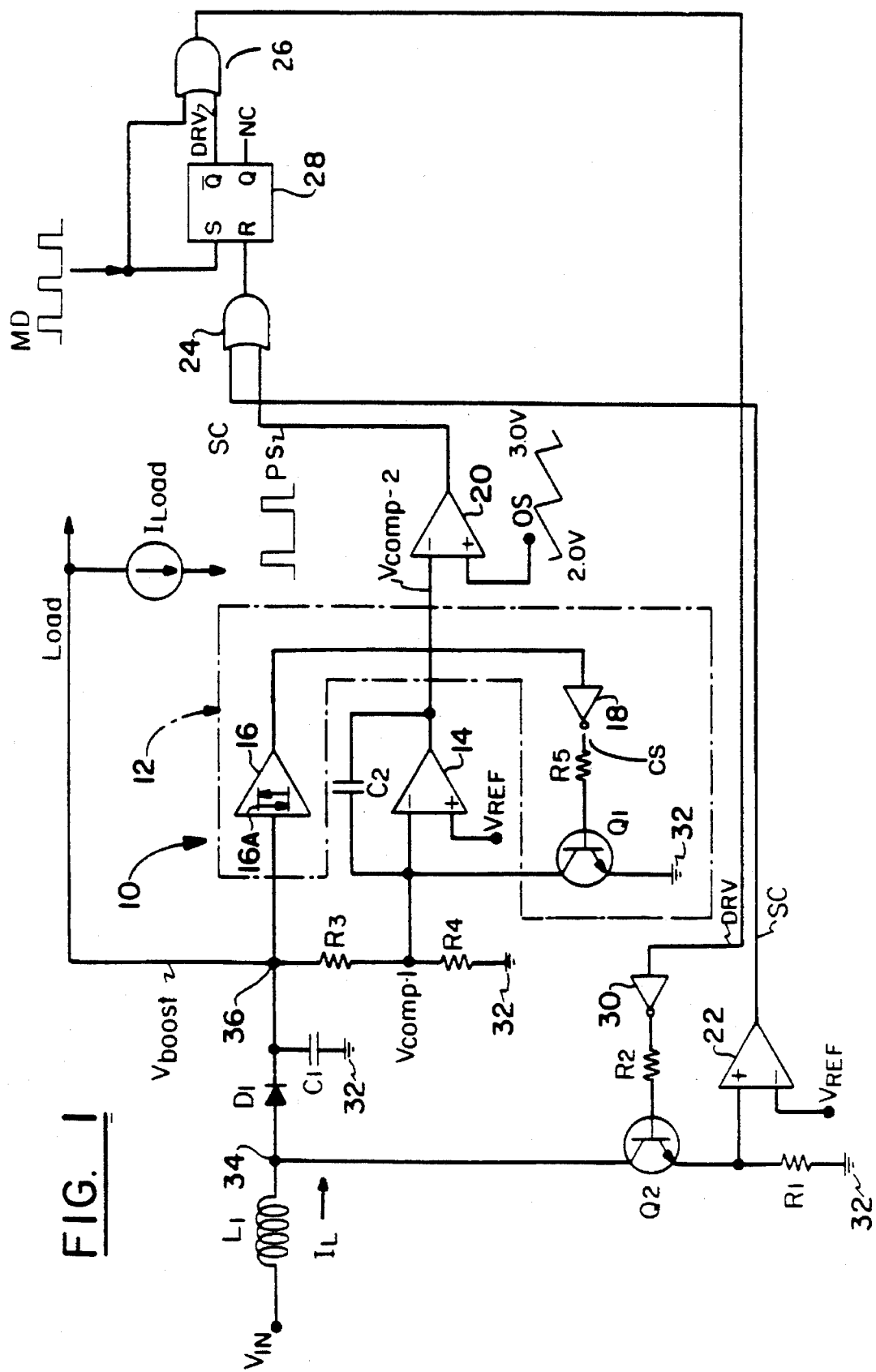
FIG. 1 is a block diagram illustrating the booster power converter of the present invention.

Referring the the drawings, wherein like reference numbers designate like elements, there is shown in FIG. 1 a block diagram of a booster power converter 10 according to the present invention. In general, the booster power converter 10 supplies short intervals of charges so that an input voltage $V_{IN}$ is increased or boosted to provide an output voltage $V_{boost}$ which is higher than the input voltage. The booster power converter 10 is particularly suited for vehicles and supplies its output voltage voltage $V_{boost}$ to a load commonly comprising voltage regulators. The booster converter 10 comprises a compensation network 12 that accelerates the response of the booster power converter 10 when the input voltage $V_{IN}$ falls below a predetermined value so that the output voltage $V_{boost}$ is maintained at a desired value that allows for the voltage regulators to perform correctly. More particularly, it is desired that the output voltage $V_{boost}$ be maintained to be greater than about 5.4 V D.C., otherwise the voltage regulator may fail to regulate. The booster power converter 10 comprises a plurality of elements having typical values/conventional components given below in Table 1, and FIGS. 2–7 illustrate a plurality of waveforms each having a general definition given in below Table 2.

TABLE 1

| REFERENCE NO. | ELEMENT | TYPICAL VALUE/ CONVENTIONAL COMPONENT |
|---|---|---|
| L1 | Inductor | 22 micro henries |
| D1 | Diode | Conventional |
| C1 | Storage Capacitor | 0.1 micro farads |
| C2 | Feedback Capacitor | 0.1 micro farads |
| R1 | Resistor | 0.2 ohms |
| R2 | Resistor | 20 k ohms |
| R3 | Resistor | 60 k ohms |
| R4 | Resistor | 13.85 k ohms |
| R5 | Resistor | 20 k ohms |
| Q1 | Transistor Switch | Conventional |
| Q2 | Transistor Switch | Conventional |
| 12 | Compensation Network | — |
| 14 | Error Amplifier | Conventional |
| 16 | First Comparator with hysteresis | Conventional |
| 18 | Inverter | Conventional |
| 20 | Second Comparator | Conventional |
| 22 | Third Comparator | Conventional |
| 24 | OR Circuit | Conventional |
| 26 | OR Circuit | Conventional |
| 28 | Flip-Flop | RS Conventional Type |
| 30 | Inverter | Conventional |

TABLE 2

| SYMBOL | GENERAL DEFINITION |
|---|---|
| $V_{IN}$ | Input Voltage to Booster Power Converter 10 |
| $V_{boost}$ | Output Voltage of Booster Power Converter 10 |
| $V_{comp-1}$ | Input Signal to Error Amplifier 14 |
| $V_{comp-2}$ | Output Signal of Error Amplifier 14 |
| CS | Control Signal of Comparator 14 |
| OS | Oscillator Signal |
| PS | Pulse Signal of Comparator 20 |
| MD | Timing Signal Indicative of Maximum Duty Cycle of Booster Power Converter 10 |
| DRV | Drive Signal of Flip-Flop 28 |
| SC | Circuit Overcurrent Condition of Booster Power Converter 10 |
| $I_L$ | Current Flowing in Inductor L1 |
| $I_{load}$ | Current Flowing into Load |

The booster power converter 10 comprises an arrangement of the inductor L1, the diode D1 having an anode and a cathode, the storage capacitor C1, and a voltage divider comprising resistors R3 and R4 arranged as shown and having an input terminal at one end of R3, an intermediate terminal at the other end of R3 and an output terminal connected to a circuit ground 32. The inductor L1 has a first end connected to the input voltage $V_{IN}$, commonly supplied from a battery of an automobile, and a second end connected to the anode of the diode D1 and forming a first node 34 therebetween. The cathode of the diode D1 is connected to a first end of the storage capacitor C1 which has its second end connected to the circuit ground 32. The first end of the storage capacitor C1 is connected to an input terminal of the voltage divider (R3 and R4) forming a second node 36 therebetween and on which the output voltage $V_{boost}$ of the booster power converter 10 is present.

The booster power converter 10 further comprises an error amplifier 14 having a first input connected to the intermediate terminal of the voltage divider (R3 and R4) and on which is supplied the input error signal $V_{comp-1}$. The magnitude of the input signal $V_{comp-1}$ is determined, in part, by the ratio of the resistors R3 and R4 and its amplitude, which along with the amplitude of other signals mentioned in reference to in FIG. 1, is described hereinafter with reference to FIGS. 2–7. The error amplifier 14 has a second input connected to a first reference voltage. The error amplifier 14 develops an output voltage $V_{comp-2}$ proportional to the difference between its first and second inputs.

The first comparator 16, the first transistor switch Q1 having input, gate and output electrodes and, preferably, inverter 18 and resistor R5 comprise the compensation network 12 which is of particular importance to the present invention. The first comparator 16 preferably has a hysteresis response indicated by the box-loop symbol 16A and further includes internal reference for comparing its received input voltage $V_{boost}$ against a predetermined threshold band having predetermined lower and upper limits. The first comparator 16 respectively generates and terminates the control signal CS when the output voltage $V_{boost}$ is less than and more than the respective lower and upper predetermined limits of the operating band. As will be further described with reference to FIGS. 3–7, the threshold band has a lower limit of about 7.0 V D.C. and an upper limit of about 9.0 V D.C. The first comparator 16 may be arranged so that the control signal CS is applied directly to the gate electrode of the first transistor switch Q1, but more preferably, is arranged so that the control signal CS is first routed to the inverter 18 which, in turn, supplies the control signal CS to the gate electrode of the first transistor switch Q1 to render it conductive during the presence of the control signal CS.

The booster power converter 10 further comprises a second comparator 20 having a first input (inverting) that receives the output signal $V_{comp-2}$ from the error amplifier 14 and a second input (non-inverting) that receives a linearly rising and falling sawtooth wave signal OS generated by an external oscillator and having a predetermined duration and predetermined high and low voltage values, such as 2.0 and 3.0 V respectively as shown in FIG. 1. As will be described with reference to FIG. 2A, the second comparator 20 generates a pulse signal PS when the amplitude of the OS signal exceeds that of the signal $V_{comp-2}$. The pulse signal PS may be directly routed to the reset input of flip-flop 28 or, more preferably, is first routed to a first input of an OR circuit 24 which, in turn, supplies the pulse signal PS to the reset input of the flip-flop 28.

The flip-flop 28 is of the RS type and is arranged with a second transistor Q2 having input, gate, and output electrodes. The second transistor Q2 is arranged so that its input electrode is connected to the first node 34, its gate electrode is responsive to the flip-flop 28 and its output electrode is connected to the circuit common 32, preferably by the resistor R1 serving as a sensing resistor. In addition to receiving the pulse signal PS on its reset input, the flip-flop 28 has a set input for receiving a timing signal MD (shown in FIG. 1) representative of the maximum predetermined duty cycle of the booster power converter 10. The timing signal MD has negative going pulses for about 80% of its duration, thereby, allowing a positive level to exist for 20% of its duration. The 80% duration represents an 80% maximum duty cycle for the booster power converter 10. The timing signal MD is also preferably routed to a first input of an OR circuit 26.

The flip-flop 28 may be arranged to generate an output drive DRV indicative of the presence of the pulse signal PS. The drive signal DRV is routed to a second input of an OR circuit 26 which, in turn, provides an output which is fed into a serial arrangement of an inverter 30 and a resistor R2 that is connected to the gate electrode of transistor Q2. The presence of pulse signal PS causes the generation of a drive signal DRV which renders transistor Q2 conductive.

The booster power converter 10 preferably further comprises a third comparator 22 having a first (non-inverting) input connected to the first end of the sensing resistor R1 and a second input (inverting) connected to a predetermined reference voltage. The predetermined reference voltage is selected to correspond to a maximum current indicative of an overcurrent condition sensed by sensing resistor R1. The third comparator 22 develops an output signal SC when the voltage present on the first input exceeds the predetermined reference voltage. This signal SC is indicative of a short circuit condition and the signal SC is routed to a second input of the OR circuit 24. The operation of the power booster converter 10 may be further described with reference to FIG. 2.

Figure 2A:
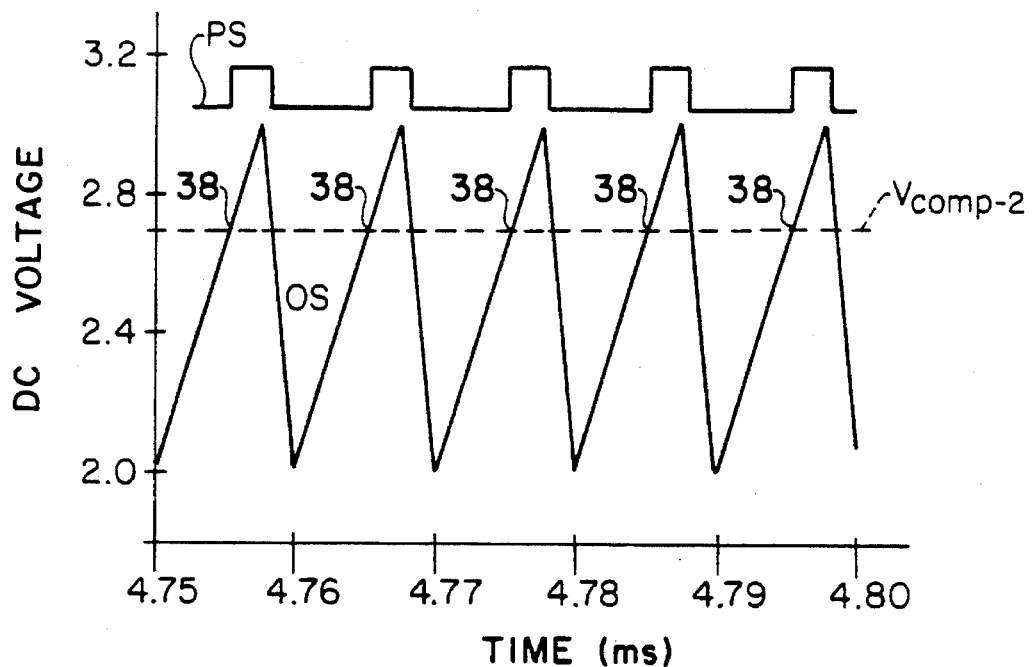
FIGS. 2A and 2B generally illustrate the steady state conditions associated with the booster power converter.
Figure 2B:
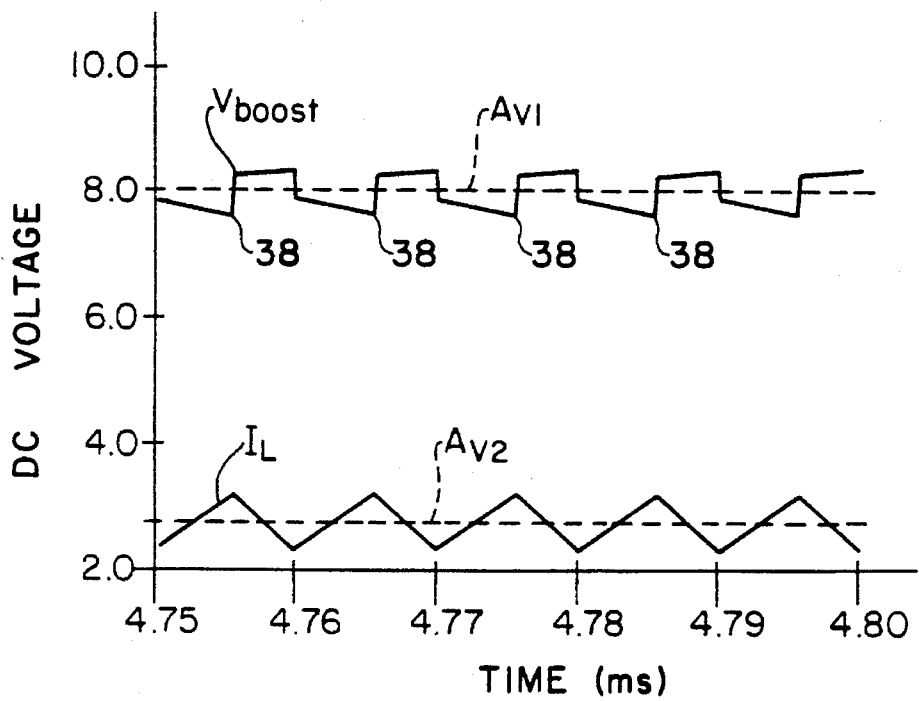

FIGS. 2A and 2B both illustrate the steady state operational conditions of the booster power converter 10, and both have a Y axis given in terms of voltage (DC) and an X axis given in terms of time (milliseconds). FIG. 2A illustrates the interrelationship of signals $V_{comp-2}$, OS, and PS, whereas FIG. 2B illustrates the interrelationship of signals $I_L$ and $V_{boost}$.

As seen with reference to both FIG. 2A and FIG. 1, the oscillating signal OS is applied to the non-inverting input of comparator 20 which receives, on its inverting input, the signal $V_{comp-2}$. As seen at event 38 of FIG. 2A, a positive going portion of the pulse signal PS is generated when the amplitude of signal OS exceeds that of the signal $V_{comp-2}$ and causes the flip-flop 28 (see FIG. 1) to be reset. The reset flip-flop 28 causes the drive signal DRV (see FIG. 1) to be generated which, in turn, is routed to the gate electrode of the second transistor switch Q2, thereby, rendering Q2 non-conductive. When the second transistor Q2 is non-conductive, it causes the inductor L1 to transfer energy into the storage capacitor C1, thereby increasing the output voltage $V_{boost}$.

As seen in FIG. 2B at event 38, the signal output voltage $V_{boost}$ initially and rapidly increases to near its peak value and then slowly increases therefrom. The output voltage $V_{boost}$ continues its increase until the trailing edge of the timing signal MD (see FIG. 1). The rising edge of MD causes the flip-flop 28 to be set which, in turn, enables the trailing edge of MD to render the second transistor switch Q2 conductive. This causes the storage capacitor C1 to discharge its stored energy, thereby, decreasing the output voltage $V_{boost}$ which may be further described with reference to FIG. 2B. The resetting and setting of the flip-flop 28 continues on a periodic basis allowing the output voltage $V_{boost}$ to increase and then decrease in a cyclic manner so as to establish an average value $A_{V1}$ shown in FIG. 2B as having a typical value of 8 volts DC. Similarly, the inductive current $I_L$ allowed to increase and decrease in a cyclic manner to establish an average value $A_{V2}$. The output voltage $V_{boost}$ continues about this average value $A_{V1}$ until a decrease in the input voltage $V_{IN}$ (see FIG. 1) is experienced which may be further described with reference to FIG. 3.

Figure 3:
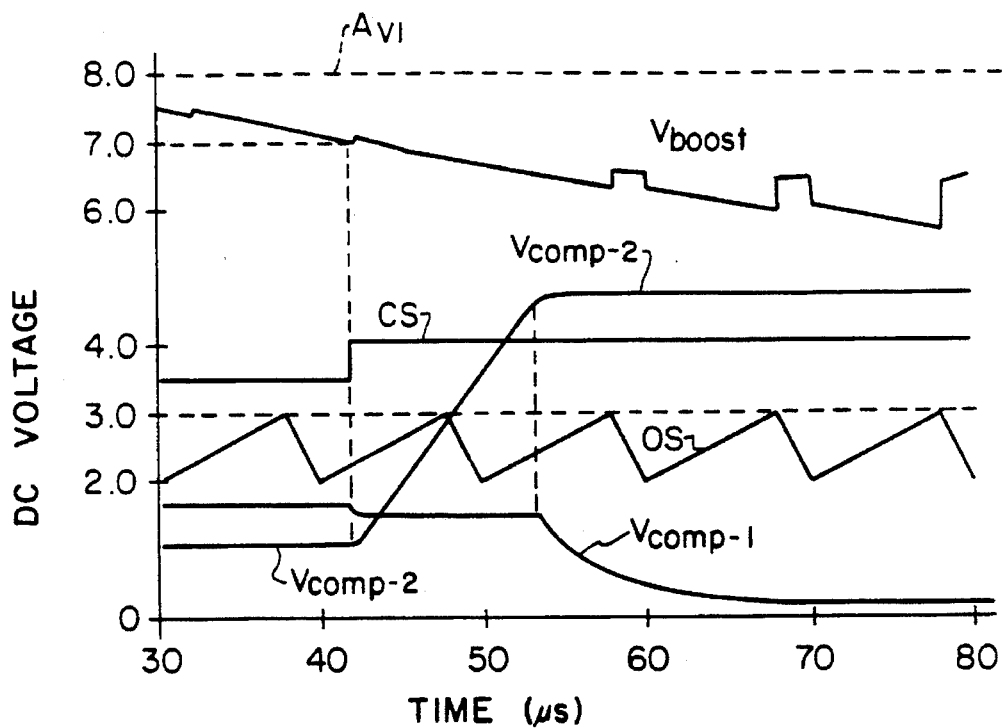
FIG. 3 illustrates the interrelationship of the signals involved with the booster power converter's response to an input voltage falling below its predetermined limit.
Figure 4:
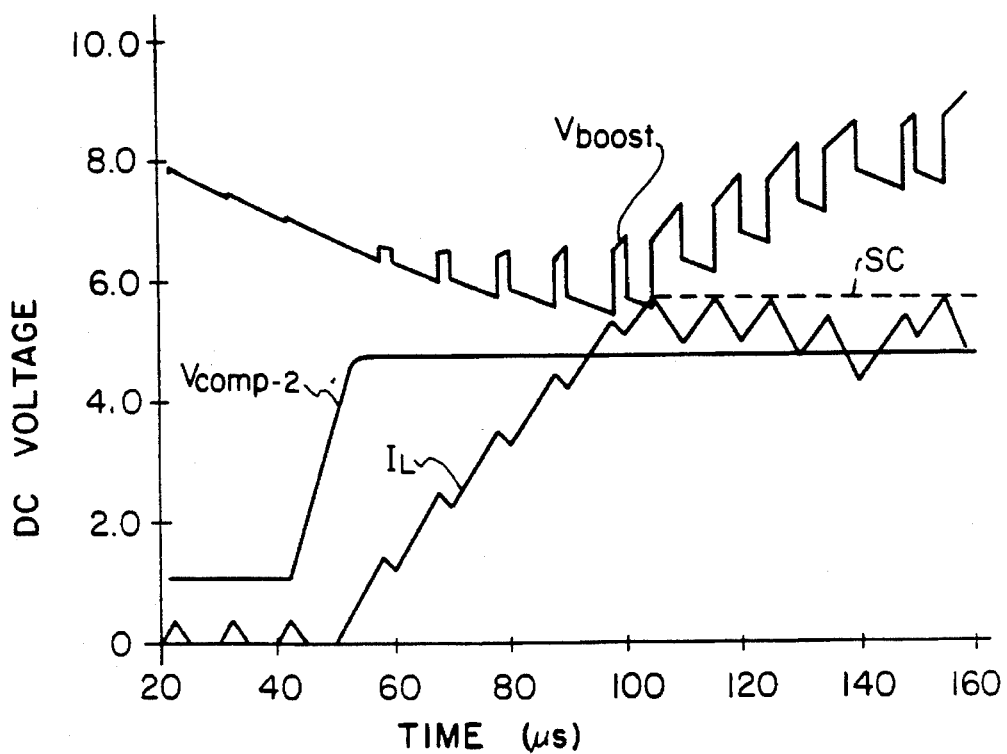
FIG. 4 further illustrates the interrelationship of signals involved with the booster power converter's response to an input voltage falling below its predetermined limit.
Figure 5:
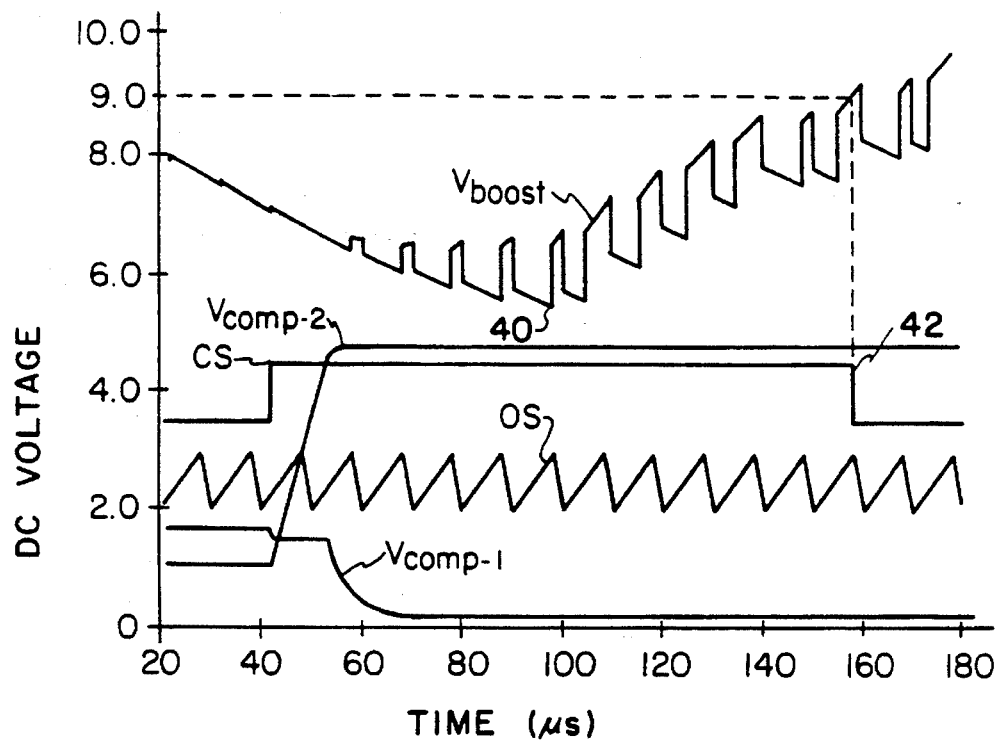
FIG. 5 still further illustrates the overall response of the booster power converter to an input voltage falling below its predetermined limit.

FIG. 3, as well as FIGS. 4 and 5, has a Y axis given in voltage (DC) and an X axis given in time (microseconds).

Figure 6:
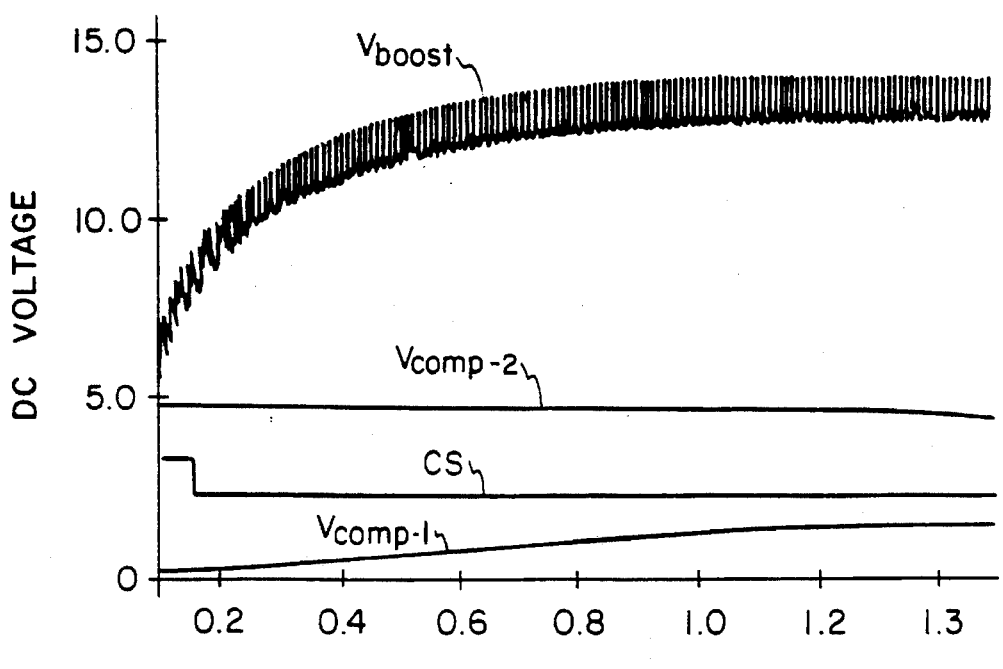
FIGS. 6 and 7 illustrate, in general, the return of the booster power converter to its normal, steady-state operating conditions.
Figure 7:
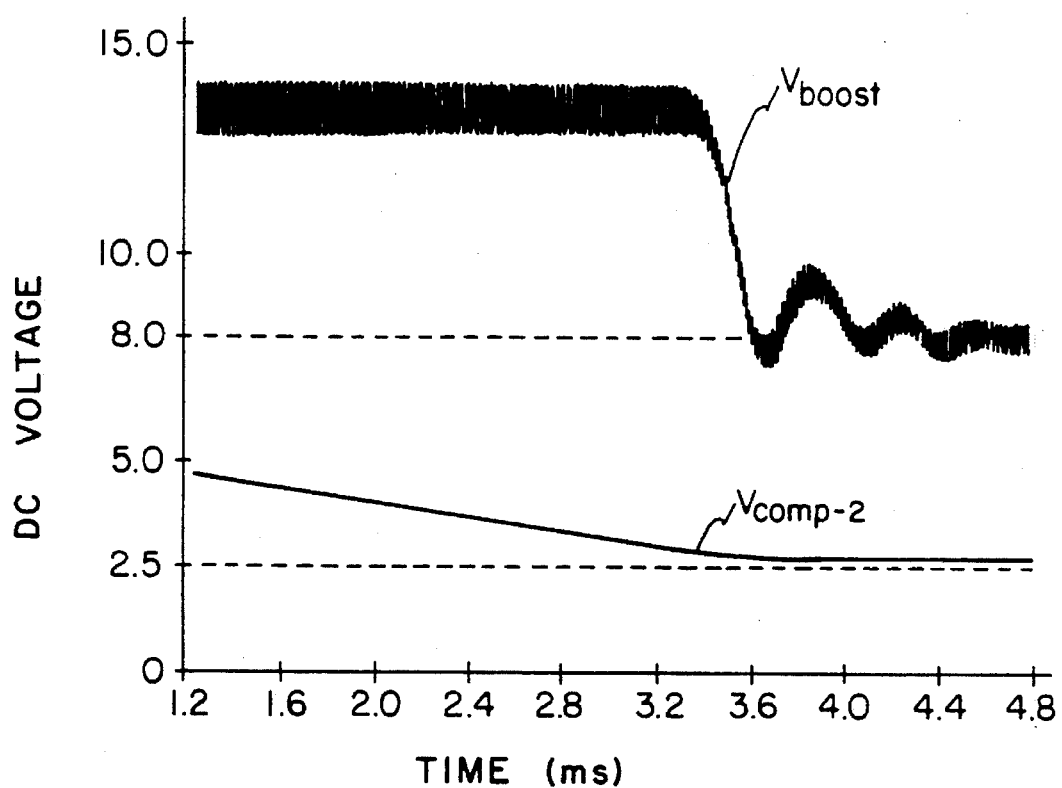

The time values shown on the X axis of FIGS. 3–5, as well as FIGS. 6 and 7, are meant to illustrate the response of the respective signals shown thereon.

FIG. 3 shows some of the primary signals and their interrelationship involved in the response of the booster power converter 10 to a sudden negative input voltage ($V_{IN}$) excursion. It is desired that the output voltage $V_{boost}$ be maintained at the $A_{V1}$ value of about 8.0 volts. This 8.0 volts is selected so as to keep the 5 volt outputs, controlled by the voltage regulators connected to the output voltage $V_{boost}$, in regulation. Without the benefits of the present invention, a rapid, negative going input voltage excursion to $V_{IN}$ may cause the voltage regulators to go out of regulation. This drawback is primarily due to the slow integrator response of a typical booster power converter. If the booster voltage falls below a critical value of 5.4 volts DC for any appreciable time, the voltage regulators drop out and are unable to perform their desired regulation. The present invention prevents such a drop out and may be described with simultaneous reference to FIGS. 1 and 3.

When the booster voltage drops to about 7.0 volts DC, the control signal CS (see FIG. 3) renders the first transistor switch Q1 conductive. The conductive transistor Q1 causes the amplifier output $V_{comp-2}$ to be forced to a value >3.0 volts DC, while the signal $V_{comp-1}$ is forced toward the potential of the circuit ground 32. As seen in FIG. 3, the signal $V_{comp-2}$ rises from about 1 to 5 volts DC within about 10–20 microseconds. Once the signal $V_{comp-2}$ is above 3.0 volts DC, the oscillator signal OS has no effect in generating the pulse signal PS (see FIG. 1) which, in turn, inhibits the generation of the drive signal DRV. More particularly, the pulse signal PS, normally applied to and responded by the reset operation of the flip-flop 28, is no longer present and now the flip-flop 28 is only responsive to the MD signal which, in turn, causes the booster power converter 10 to operate at its maximum duty cycle of 80%. The operation of the power booster converter 10 at its maximum duty cycle (80%) may be further described with reference to FIG. 4.

The operation of the booster power converter in its maximum duty cycle causes the inductive current $I_L$, shown in FIG. 4, to rapidly increase, while the output voltage $V_{boost}$ is still decreasing. Within about 5 or 6 switching cycles, after $V_{comp-2}$ attained a value of >3.0 V DC, the current $I_L$ in the inductor L1 reaches a short circuit current latch off level, which is sensed by the sensing resistor R1 and the third comparator 22 (see FIG. 1). The third comparator 22 determines that its predetermined maximum limit (previously discussed) has been exceeded so that the signal SC is generated which, in turn, is applied to OR circuit 24 which, in turn, resets the flip-flop 28. The reset flip-flop 28 allows more time for the inductor L1 to transfer energy into the storage capacitor C1 which, in turn, increases the boosted voltage $V_{boost}$. As seen in FIG. 4, at phantom line which corresponds to the generation of signal SC, the $V_{boost}$ signal starts to increase. So long as the $V_{boost}$ does not fall below the 5.4 volts DC, previously mentioned, the regulators connected to the output voltage $V_{boost}$ continue to perform their desired regulation. The initiation of the return of the booster power converter 10 to its steady state conditions may be further described with reference to FIG. 5.

FIG. 5 illustrates, in part, the fall and the rise of the output voltage $V_{boost}$. It should be noted that the output voltage $V_{boost}$ never falls below the 5.4 V DC value. FIG. 5 further illustrates that the generation of the control circuit CS causes the rapid rise, previously discussed, of the signal $V_{comp-2}$ from approximately 1.0 volts to approximately 5.0 volts. Further, FIG. 5 illustrates that the generation of the control signal CS causes the $V_{comp-1}$ to be forced down, previously discussed, to a near zero voltage condition. Still further, FIG. 5 illustrates that the output voltage $V_{boost}$ rises from its negative condition (below 6.0 V) shown by event 40, to a value of about 9.0 volts in about 20 microseconds. The attainment of the 9.0 volts for the output voltage $V_{boost}$ is recognized by the first comparator 16 (see FIG. 1) which, in turn, responds by inhibiting the generation of the signal CS (as shown in FIG. 5 by event 42). The response of the booster power converter 10 to the removal of signal CS may be further described with reference to FIG. 6.

FIG. 6, as well as FIG. 7, has a Y axis given in voltage (DC) and an X axis in time (milliseconds). FIG. 6 illustrates that once the signal CS is removed, the signal $V_{comp-1}$ rises (see X axis at about 0.2 ms) to its maximum value (see X axis at about 1.4 ms). As can be seen in FIG. 6, the signal $V_{comp-2}$ remains at a 5 volt DC value thereby, as previously discussed, causing the booster power converter to continue to maintain its maximum duty cycle operation (80%). The operation of the maximum duty cycle causes the output voltage $V_{boost}$ to increase in a relatively rapid manner up to a value of approximately 13 volts DC. The eventual decay of the signal $V_{comp-2}$ allows the power booster converter 10 to revert to its normal duty cycle which may be further described with reference to FIG. 7.

FIG. 7 illustrates that the signal $V_{comp-2}$ decays from its value of approximately 5.0 (see X axis at about 1.2 ms) to a value of approximately 2.7 volts (see X axis at about 3.6 ms). FIG. 7 further illustrates that the output voltage $V_{boost}$ drops from about 13 volts DC to approximately 8 volts DC when the $V_{comp-2}$ obtains its reduced value of approximately 2.7 volts. As previously discussed with reference to FIG. 2A, the attainment of a voltage <3.0 DC allows the sawtooth OS signal to generate the periodically occurring pulse signal PS. The $V_{comp-2}$ value of 2.7 volts DC continues and allows the $V_{boost}$ signal to seek and obtain its desired $A_{V1}$ value of 8.0 volts described with reference to FIG. 2B. The continued or steady state operation of the booster power converter 10 is as shown in FIGS. 2A–2B.

The steady state operation of FIGS. 2A–2B is continued until the input voltage $V_{IN}$ is once again varied. Due to loop dynamics, the output voltage $V_{boost}$ may or may not undershoot the 7.0 volts DC threshold established by the comparator 16 due to this input voltage $V_{IN}$ variation. Such an overshoot commonly depends upon the current loading ($I_{load}$) of the output voltage $V_{boost}$. Thus, during each fast negative battery transition, manifested by a sharp decrease in $V_{IN}$, the 80% mode of operation of the booster power converter 10 will either be one of a relatively short duration or it will be repetitive until the battery voltage ($V_{IN}$) increases and stabilizes to its desired value. However, in spite of an unstable battery, the operation of the booster power converter 10 maintains the output voltage $V_{boost}$ above the critical value of 5.4 V DC so that the voltage regulators may continue their proper operation.

It should now be appreciated that the practice of the present invention provides for a booster power converter that has an improved speed of response so that voltage transients experienced at its input voltage $V_{IN}$ will be responded to in such a manner so as to maintain the output voltage $V_{boost}$ above a critical value of 5.4 volts DC.

It should be further appreciated that although the hereinbefore given description of the power booster converter was particularly suited for automotive applications, it should be recognized that the principles of the present invention teach the use of power booster converters having a rapid response that may find application in many other fields of use.

We claim:

1. A booster power converter having a circuit common, receiving an input voltage $V_{IN}$ and developing an output voltage $V_{boost}$ which is higher than said input voltage $V_{IN}$, said booster power converter comprising:

(a) an arrangement of an inductor, a diode having an anode and a cathode, a storage capacitor, and a voltage divider for dividing an applied voltage by a predetermined amount and having an input terminal, an intermediate terminal for making available a divided voltage and an output terminal, said inductor having a first end connected to said input voltage $V_{IN}$ and a second end connected to said anode of said diode and forming a first node therebetween, said cathode of said diode connected to a first end of said storage capacitor which has its second end connected to said circuit common, said first end of said storage capacitor connected to said input terminal of said voltage divider and forming a second node therebetween and on which said output voltage $V_{boost}$ is present, said voltage divider having its output terminal connected to said circuit common;

(b) an error amplifier having a first input terminal connected to said intermediate terminal of said voltage divider and having an input signal $V_{comp-1}$ thereon, and a second input terminal connected to a first reference voltage, said error amplifier developing an output voltage $V_{comp-2}$ proportional to a difference between said input signal $V_{comp-1}$ and said first reference voltage;

(c) an arrangement of a first comparator and a first transistor switch having an input electrode, a gate electrode, and an output electrode, said first transistor switch being arranged to have its input electrode connected to said intermediate terminal of said voltage divider, its gate electrode responsive to said first comparator and its output electrode connected to said circuit common, said first comparator comparing said output voltage $V_{boost}$ with an internal reference voltage that establishes a threshold band having lower and upper predetermined limits, said first comparator generating a control signal CS when $V_{boost}$ falls below said lower limit and subsequently terminating said control signal CS when $V_{boost}$ thereafter rises above said upper limit, said control signal CS being connected to said gate electrode of said first transistor switch and rendering said first transistor switch conductive;

(d) a second comparator having a first input terminal receiving said output voltage $V_{comp-2}$ and a second input terminal receiving a linearly rising and falling sawtooth wave signal OS, said second comparator developing a pulse signal PS when the OS signal exceeds the output signal $V_{comp-2}$; and (e) an arrangement of a flip-flop and a second transistor switch having an input electrode, a gate electrode, and an output electrode, said second transistor switch being arranged to have its input electrode connected to said first node, its gate electrode responsive to said flip-flop and its output electrode connected to said circuit common, said flip-flop having set and reset input terminals, said reset input terminal receiving said pulse signal PS and said set input terminal receiving a timing signal MD representative of a predetermined duty cycle of said booster power converter, said flip-flop generating an output drive signal DRV indicative of the receipt of said pulse signal PS, said drive signal DRV being connected to said gate electrode of said second transistor switch and rendering said second transistor switch conductive.

2. A booster power converter having a circuit common and receiving an input voltage $V_{IN}$ and developing an output voltage $V_{boost}$ which is higher than said input voltage $V_{IN}$, said booster power converter comprising:

(a) an arrangement of an inductor, a diode having an anode and a cathode, a storage capacitor, and a voltage divider for dividing an applied voltage by a predetermined amount and having an input terminal, an intermediate terminal for making available a divided voltage and an output terminal, said inductor having a first end connected to said input voltage $V_{IN}$ and a second end connected to said anode of said diode and forming a first node therebetween, said cathode of said diode connected to a first end of said storage capacitor which has its second end connected to said circuit common, said first end of said storage capacitor connected to said input terminal of said voltage divider and forming a second node therebetween and on which said output voltage $V_{boost}$ is present, said voltage divider having its output terminal connected to said circuit common;

(b) an error amplifier having a first input terminal connected to said intermediate terminal of said voltage divider and having an input signal $V_{comp-1}$ thereon, and a second input terminal connected to a first reference voltage, said error amplifier developing an output voltage $V_{comp-2}$ proportional to a difference between said input signal $V_{comp-1}$ and said first reference voltage;

(c) an arrangement of a first comparator and a first transistor switch having an input electrode, a gate electrode, and an output electrode, said first transistor switch being arranged to have its input electrode connected to said intermediate terminal of said voltage divider, its gate electrode responsive to said first comparator and its output electrode connected to said circuit common, said first comparator comparing said output voltage $V_{boost}$ with an internal reference voltage that establishes a threshold band having lower and upper predetermined limits, said first comparator generating a control signal CS when $V_{boost}$ falls below said lower limit and subsequently terminating said control signal CS when $V_{boost}$ thereafter rises above said upper limit, said control signal CS being connected to said gate electrode of said first transistor switch and rendering said first transistor switch conductive;

(d) a second comparator having a first input terminal receiving said output voltage $V_{comp-2}$ and a second input terminal receiving a linearly rising and falling sawtooth wave signal OS, said second comparator developing a pulse signal PS when the OS signal exceeds the output signal $V_{comp-2}$;

(e) an arrangement of a flip-flop and a second transistor switch having an input electrode, a gate electrode, and an output electrode, said second transistor switch being arranged to have its input electrode connected to said first node, its gate electrode responsive to said flip-flop and its output electrode connected to said circuit common, said flip-flop having set and reset input terminals, said reset input terminal receiving said pulse signal PS and said set input terminal receiving a timing signal MD representative of a predetermined duty cycle of said booster power converter, said flip-flop generating an output drive signal DRV indicative of the receipt of said pulse signal PS, said drive signal DRV being connected to said gate electrode of said second transistor switch and rendering said second transistor switch conductive;

(f) an OR circuit interposed between said second comparator and said flip-flop and having first and second input terminals with the first input terminal receiving said pulse signal PS;

(g) a sensing resistor interposed between said output electrode of said second transistor switch and said circuit common; and (h) a third comparator having a first input terminal connected between said sensing resistor and said output electrode of said second transistor switch, and a second input terminal connected to a second reference voltage corresponding to a predetermined maximum current, said third comparator developing an output voltage SC when a voltage present on said first input terminal exceeds said second reference voltage, said output voltage SC being connected to said second input of said OR circuit.

3. A booster power converter having a circuit common, receiving an input voltage $V_{IN}$, and developing an output voltage $V_{boost}$ which is higher than said input voltage $V_{IN}$, said booster power converter further having a predetermined maximum duty cycle and comprising:

(a) means connected to said input voltage $V_{IN}$ for directing said input voltage $V_{IN}$ to an energy storage device having an output terminal on which said output voltage $V_{boost}$ present;

(b) means responsive to a switching signal for alternately charging and discharging said energy storage device;

(c) first comparison means having a first input terminal connected to said output of said energy storage device and a second input terminal connected to a reference voltage, said first comparison means generating a first output signal representative of a difference between said output voltage $V_{boost}$ and said reference voltage;

(d) second comparison means having a first input terminal receiving said first output signal and a second input terminal connected to a periodic timing signal, said second comparison means generating second output signal representative of a difference between said timing signal and said first output signal;

(e) first switching means connected to said second output signal and generating said switching signal in response thereto;

(f) third comparison means having an input terminal connected to said output terminal of said energy storage device and generating a third output signal when said output voltage $V_{boost}$ falls below a predetermined value and, conversely, terminating such third output signal when said output voltage $V_{boost}$ rises above a predetermined value; and (g) second switching means connected to said third output signal for connecting said first input terminal of said first comparison means to said circuit common in response to said third output signal.

\* \* \* \* \*